United States Patent

Skime

[15] 3,690,394
[45] Sept. 12, 1972

[54] SHOCK MOUNTED SUSPENSION SYSTEM

[72] Inventor: Roger H. Skime, Thief River Falls, Minn.

[73] Assignee: Arctic Enterprises, Inc., Thief River Falls, Minn.

[22] Filed: June 15, 1970

[21] Appl. No.: 46,065

[52] U.S. Cl. ................................180/5 R, 305/24
[51] Int. Cl. ............................................B62m 27/02
[58] Field of Search ........180/5 R, 5 A, 9.54; 305/24, 305/25, 27, 28, 35 EB

[56] References Cited

UNITED STATES PATENTS

| 2,284,075 | 5/1942 | Tucker | 180/5 R |
| 3,613,810 | 10/1971 | Hetteen | 180/5 R |
| 3,613,811 | 10/1971 | Brandli | 180/5 R |
| 1,069,761 | 8/1913 | Buckley | 180/5 |
| 1,178,552 | 4/1916 | Strait | 305/28 X |
| 2,339,886 | 1/1944 | Shannon | 180/5 |
| 3,485,312 | 12/1969 | Swenson | 180/5 |
| 3,369,622 | 2/1968 | Thomas | 180/5 |

FOREIGN PATENTS OR APPLICATIONS

| 151,835 | 3/1932 | Switzerland | 305/27 |

OTHER PUBLICATIONS

Polaris' 71 First on the Freedom Trail Advertised in brochure of Polaris Industries Published May 1970, pages 1, 10 and 11

Primary Examiner—Richard J. Johnson
Attorney—Schroeder, Siegfried and Ryan

[57] ABSTRACT

A slide rail snowmobile tread drive suspension system is disclosed which incorporates a shock absorber between the stems of the variable length lever arms which support the body frame apart from the slide rail frame. Individually adjustable spring biasing is provided to compensate for varying snow conditions.

2 Claims, 4 Drawing Figures

INVENTOR.
ROGER H. SKIME
BY Schroeder, Siegfried
+ Ryan
ATTORNEYS

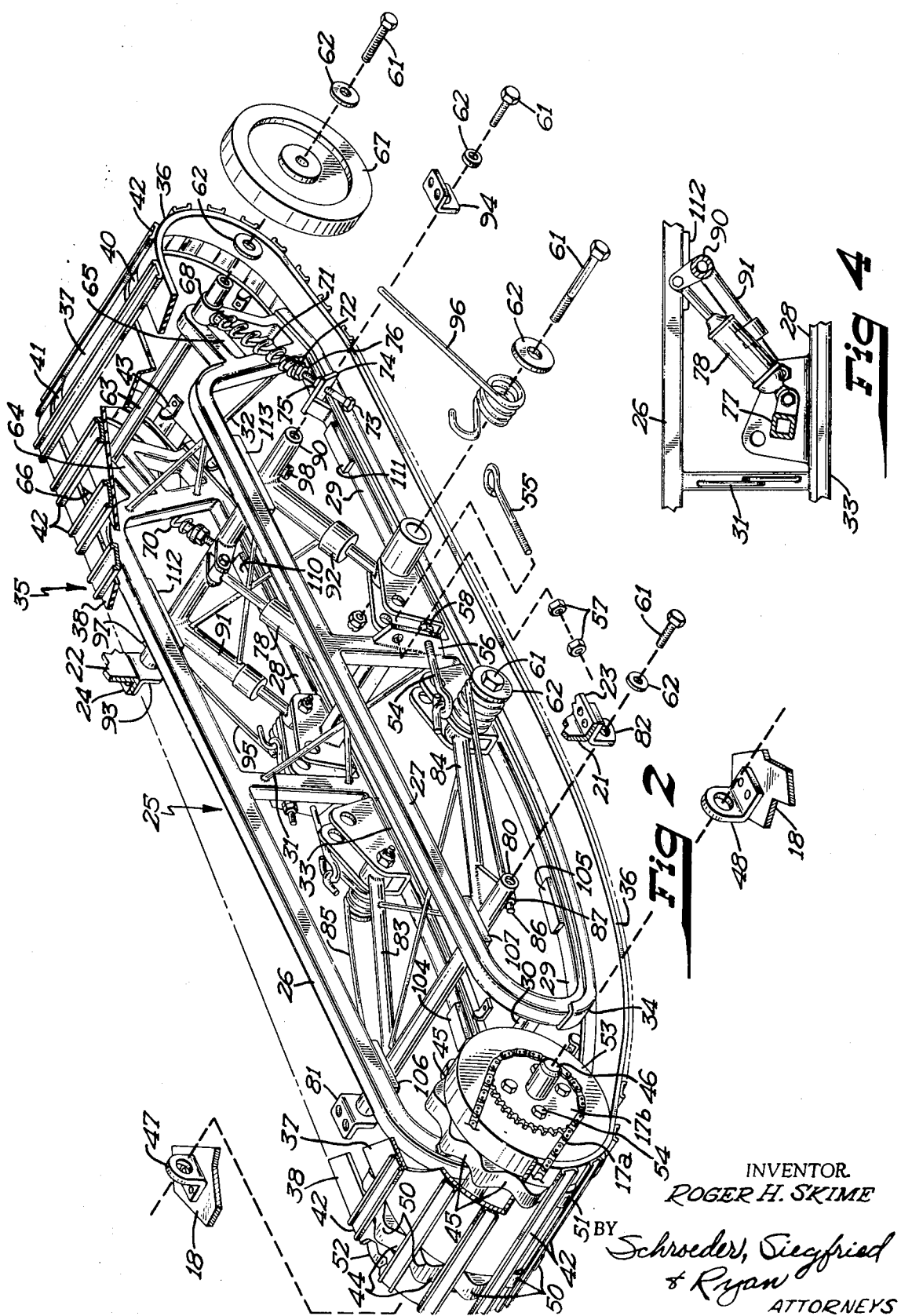

SHOCK MOUNTED SUSPENSION SYSTEM

BRIEF SUMMARY OF THE INVENTION

This invention is directed to snowmobiles and is more specifically directed to snowmobiles having slide rail suspension systems for the tread drive portion, as disclosed in a patent to Swenson et al., U.S. Pat. No. 3,485,312, issued Dec. 23, 1969.

A slide rail tread suspension system in accordance with my invention comprises a frame member having runners along the lower edges thereof for engagement with the endless track, which drives the snowmobile. The frame member is mounted to move within the U-shaped cavity formed by the body frame at the rear portion of a snowmobile. The body frame and the tread suspension frame are movably joined to one another by lever arm members, which are spring biased to hold the body frame and slide rail suspension frame apart from one another. When such a suspension system moves across rough terrain, the spring members tend to absorb much of the shock which is produced by the encountering of obstacles in the uneven surface over which the snowmobile is traveling. However, I have found that a greatly superior ride and improved durability results if the suspension system is modified to include a shock absorber, as will be described more fully hereinbelow. As further elements of my improvements, I have provided a slide rail suspension frame which does not incorporate forward idler wheels, but rather utilizes the runner members of the slide frame as the sole backup to the tread member at the forward ground surface engaging portion of the endless tread drive. As yet another feature of my invention, I have provided individual spring tensioning so as to variably adjust the spring tension on the forward lever arm suspension system and on the rear arm suspension system. This individual adjustment permits the user of the snowmobile to obtain maximum performance from his vehicle under all types of ground surface conditions.

BRIEF DESCRIPTION OF THE DRAWINGS

FIG. 2 is a perspective view of the slide rail and sprocket drive mechanism showing a portion of the tread broken away;

FIG. 4 is a diagramatic view of a rear lever arm suspension member and shock absorber mounting in elevational view.

Figure 1:
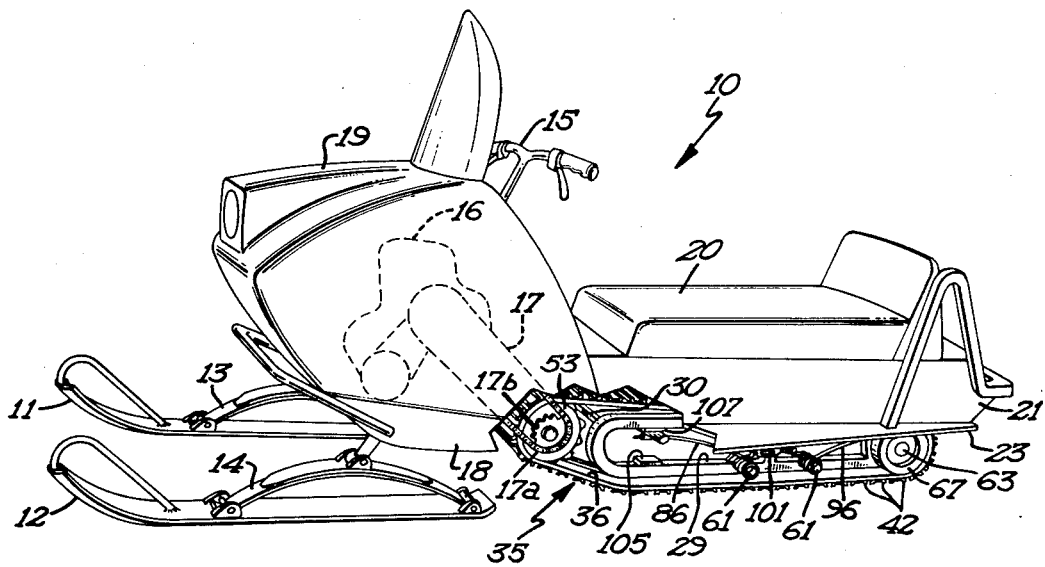
FIG. 1 is an elevational side view of a snowmobile showing a portion of the body housing broken away to expose the tread mechanism and the forward portion of the slide rail frame.

Referring primarily to FIG. 1, a snowmobile 10 has a pair of front skis 11 and 12 which are secured through a spring suspension system 13 and 14, respectively. The steering is controlled by a pair of handle bars 15. Located in the front of the snowmobile is an engine 16 and a chain drive mechanism 17. Engine 16 and drive mechanism 17 are shown in phantom and are secured to a body frame mechanism 18 and disposed beneath a hood 19, which is hinged at the front thereof and allowed to be "flipped" forwardly to expose the engine and other mechanisms under the hood. Engine 16 may be of any general type such as engines manufactured by the Kohler Corporation or the Onan Company. In this particular disclosure, chain drive mechanism 17 is contained in an oil bath enclosure to provide a constant lubrication.

Body 18 is constructed of an aluminum alloy and is reinforced by suitable frame structures where needed. The rear body portion is in the form of an inverted U cross section, and this is shown primarily in FIG. 1 where a cushion 20 is formed across the upper portion of the body frame and a pair of side panels 21 and 22 (FIG. 3) extend downwardly and terminate at the location of a pair of foot rests 23 and 24 (FIG. 2).

In the discussion of the figures, the numerical designations will be the same as with regard to other figures where the parts are substantially the same.

Referring primarily to FIG. 2, there is illustrated an elongated tread supporting frame generally designated 25 which is formed of a pair of upstanding members 26 and 27 secured to each other in spaced and confronting relationship. Each of the sections 26 and 27 have a center post formed therein to strengthen the sections. The lower portions of each of the upstanding sections 26 and 27 form a pair of runners 28 and 29, with the rear portion of the runner tilting slightly upward at the extremity thereof. In the preferred form of the invention, the forward approximately one-third of the lower portions of sections 26 and 27 tilts upwardly at a modest angle and connects by an arcuate configuration with the upper bar of the section. Three cross braces 30, 31, and 32 are secured between the upstanding frame sections 26 and 27 to form a substantially rigid and box-like arrangement.

Referring to FIG. 1, it will be seen that the slide rail frame does not have the forward upwardly tilted portion shown in FIG. 2. Such an upward tilting portion is not required, but is a desirable feature where maximum performance is desired. Also, the specific slide rail frames of the drawings do not include the forward idler wheel as shown in the Swenson et al. U.S. Pat. No. 3,485,312, providing a support for tread 35 between the sprocket wheels and the runner portion of frame 25. However, many of the advantages of my invention can be obtained in systems which do include such forward idler wheels.

Runner portions 28 and 29 of frame sections 26 and 27, respectively, have a pair of shoes 33 and 34 secured thereto by suitable means such as screws or machine bolts. The shoes are of U-shape cross section and fit snugly around the runners 28 and 29.

An endless tread 35 is formed from three flexible belt sections 36, 37 and 38. Belt 37 is centrally located and belts 36 and 38 are of narrower construction, the three being fitted together to provide a pair of elongated slits 40 and 41, which run longitudinally of tread 35. Openings 40 and 41 are of sufficient width to allow shoes 33 and 34 to bear upon a plurality of tread cross bars 42, which are evenly spaced along tread 35. The cross bars are shallow channel members formed of heat treated steel and are secured to belts 36, 37 and 38 by suitable means such as rivets. Cross bars 42 have their flat surfaces drawn over shoes 33 and 34, which offer very little friction to the sliding movement because they are formed of relatively low friction polyester resin material, one form of which is known as "Hi-Fax 1900," which is manufactured by the Dayco Corporation of Three Rivers, Mich. To help alleviate any side sway of the tread 35, a plurality of guide members 43 are secured on the inside surface of belt section 37 and are formed of right angle portions so that the depending portion of the guide members engage the sidewalls of shoes 33 and 34. The guide members may be fastened to the tread by a suitable means, such as rivets, where belt section 37 is secured to cross bars 42.

A pair of sprocket wheels 44 and 45 are secured to a shaft 46, which is journaled to a pair of bearings 47 and 48. Bearings 47 and 48 are secured to a portion of the body frame 18 by suitable means, such as bolts or rivets. Sprocket wheels 44 and 45 have a plurality of teeth 50 and 51, respectively, which engage cross bars 42 to impart movement to tread 35. Sprocket wheels 44 and 45 include load bearing wheels 52 and 53, respectively, which support tread portions 38 and 36 of tread 35. Rotation of shaft 46 is imparted through a chain 17A and a chain sprocket wheel 17B, which is secured to wheel 53 by suitable means, such as a plurality of bolts 54.

At the rear of the tread mechanism, a shaft 63 is supported in a pair of slots 64 and 65, formed in the framework of sections 26 and 27. Secured to shaft 63 are a pair of tread supporting wheels 66 and 67. Wheels 66 and 67 are secured to shaft 63 by appropriate means, such as bolts 61 and washers 62. A pair of bushings (only one of which is shown and is designated reference numeral 68) are fitted over shaft 63 and support one end of a pair of springs 70 and 71. The other end of the springs are supported by a pair of collar members (only one of which is shown and is designated by reference numeral 72). Collar member 72 extends into spring 71 and is held in place by a bolt 73, which passes through a bracket 74 that is secured to the lower or runner portion 29 of frame section 27. Bolt 73 is held in place by a pair of stop nuts 75 and 76. It will, of course, be understood that spring 70 is secured to runner 28 in the same manner.

A simple lever member 80 is shown in the form of a double T-shaped tubular member, which has its upper end pivotally secured to a pair of brackets 81 and 82, which are secured, respectively, to foot rests 24 and 23, forming a portion of body frame 18. Brackets 81 and 82 are secured to body frame 18 by a suitable means, such as bolts or welding, and lever member 80 is secured to brackets 81 and 82 by a suitable means, such as machine bolts 61 and washers 62. Lever member 80 has a pair of tubular stem portions 83 and 84, which have pivotal connections at the lower ends thereof, the connections being made with a pair of upstanding lug members secured to runners 28 and 29 by suitable means, such as bolts 61 and washers 62. Secured by the upstanding lug portions of runners 28 and 29 are a pair of spiral springs 85 and 86, which are secured adjacent the outer edges of tubular members 83 and 84, respectively. The upper end of springs 85 and 86 are held in place by a pair of spring keepers (only one of which is shown and is designated reference numeral 87).

In a similar manner, a rearwardly disposed lever member 90 has a pair of tubular telescoping members 91 and 92, which form the stem portion of the double T-shaped lever member. The cross bar portion of the T-shaped member is secured to a pair of brackets 93 and 94, which are adapted to be secured respectively to the foot rest portions 24 and 23 of body 18. The cross bar portion of lever 90 is secured to brackets 93 and 94 by a suitable means, such as machine screws 61 and washers 62. The lower portions of telescoping members 91 and 92 are pivotally secured to a pair of lug members formed on runners 28 and 29 by a suitable means, such as machine screws 61 and washers 62. The location of the lower pivotal portions of members 84, 85, 91 and 92 is near the center posts reinforcing frame members 26 and 27. A pair of spiral springs 95 and 96 are secured to the lug portions by bolts 61 and are held in place at the upper end of lever member 90 by a pair of spring keepers 97 and 98. Each of springs 85, 86, 95 and 96 has an upstanding "hook-like" portion which is engaged by a threaded bolt member having an eyelet therein. In FIG. 2, springs 86 and 96 are respectively engaged by bolt members 54 and 55, which pass through an upstanding plate member 56, which is secured to the reinforcing posts of frame member 27. Plate 56 may be attached to frame member 27 by any suitable means, such as welding. Nuts 57 and 58 are provided for bolts 54 and 55 to provide separate tension adjustment to springs 86 and 96. In like manner, springs 85 and 95 are provided with individual tension adjusting means.

In FIG. 1, a turnbuckle 101 is shown which has a pair of eyelet members at each end thereof for engaging springs 85 and 95 (not shown) and springs 86 and 96 in a somewhat analogous manner to that previously discussed. In the showing of the single turnbuckle of FIG. 1, equal tension will be applied to each of the springs, both forward and rear. In the preferred form of my invention, separate tension adjustment, as shown in FIG. 2, is utilized for purposes which will be more thoroughly set out below.

During the operation of the vehicle, it will be seen that the tread is moved with relative ease over shoes 33 and 34, and that when a protrusion on the surface is encountered, the frame mechanism 25 is forced upwardly into the recess of body frame 18 and is pivoted about the upper and lower ends of front lever element 80. Because the motion is a rotational motion, as frame 25 moves upwardly and slightly to the rear of the snowmobile, telescoping members 91 and 92 are shortened slightly and the tension is increased on all of the springs. The increased tension causes the frame 25 to be forced downwardly back toward its normal position. Of course, some obstructions on the surface being traveled may produce such violent impact to tread 35 as to cause springs 70 and 71 to be slightly compressed, thus allowing the tread a complete freedom of movement while traveling over the terrain. It will also be recognized that the load carried by snowmobile 10 will vary and therefore the tension on springs 85, 86, 95 and 96 may be adjusted to compensate for the difference in load. When abrupt obstacles are encountered, frame 25 may be abruptly forced upwardly and rearwardly so that it will result in the lever members coming into contact with the frame members 26 and 27. Rubber bumper members 104, 105, 106, 107, 110, 111, 112 and 113 are provided on the upstanding frame members 26 and 27 to cushion such severe impact.

In high performance snowmobiles such as those used in racing, the slide frame 25 will be shorter in overall length than in the more conventional models utilizing slide rails and including forward idler wheels. However, the shorter frame 25 results in more severe rotational motion of frame 25 and gives a rougher ride.

As a means of ensuring a smoother ride, as well as preventing undue stresses being introduced into the overall assembly, I have provided a shock absorber which is connected at its lower end to a bar member 77, which joins the lower portions 28 and 29 of frame 25 at a point near the pivotal lug members for rear lever member 90. Bar member 77 may be a U-shaped angle iron member which is suitably joined to upstanding frame members 28 and 29 by a means such as welding. A shock absorber generally designated 78 having a telescoping spindle portion is mounted to lug members on bar 77 and to a lug member on cross bar of double T lever member 90, as is best shown in the schematic of FIG. 4. The lug mountings are preferably pivotal mountings on axes which are parallel to, but different from, the pivotal axes for the upper and lower ends of lever arm 90. It is possible to have the pivotal axes at the upper and lower ends of the shock absorber on the same respective axes as the pivoting axes of member 90. However, a more preferred form is that shown in FIG. 4 where the shock absorber is mounted so as to have its pivoting axes different from the upper and lower pivoting axes of lever member 90. It will be understood that the plane of motion for shock absorber 78 will be parallel to the plane of motion for telescoping stems of lever member 90.

The reason for the preferred structure as shown in FIG. 4 is believed readily apparent. Due to the type of motion brought about by the encounter of frame member 25 with obstacles in the snowmobile's path, there is not a great deal of telescoping action that takes place with stems 91 and 92 of rear lever arm 90. The motion tends to be rather short, which does not provide for the maximum shock absorber action. By locating the shock absorber on the axes indicated, an increased amount of motion is provided in the shock absorber spindle over the actual travel that is taking place in telescoping arms 91 and 92. This increased motion of the shock absorber over that of the telescoping stems of lever 90 provides more efficient shock absorber action.

It should be noted that the shock absorber in any of the described locations does not provide the support for the body frame. The load of the snowmobile body frame 18 at the rear portion thereof is substantially entirely carried by telescoping arms 91 and 92, insofar as any sideward thrust along the telescoping walls is concerned. This is important, as shock absorbers are not ordinarily designed to stand sideward thrust along the spindle. By following the construction I have described, a shock absorber functions solely in its preferred mode of motion along its axis without any loading occurring in a sideward mode.

The choice of shock absorber will depend to some degree upon the design purposes of the application. The shock absorber may be of conventional types such as units manufactured by Monroe. As the total length of travel of the spindle arm in and out of the shock absorber is relatively short, it will generally be desirable to have a shock absorber which is designed for this type of service.

Figure 3:
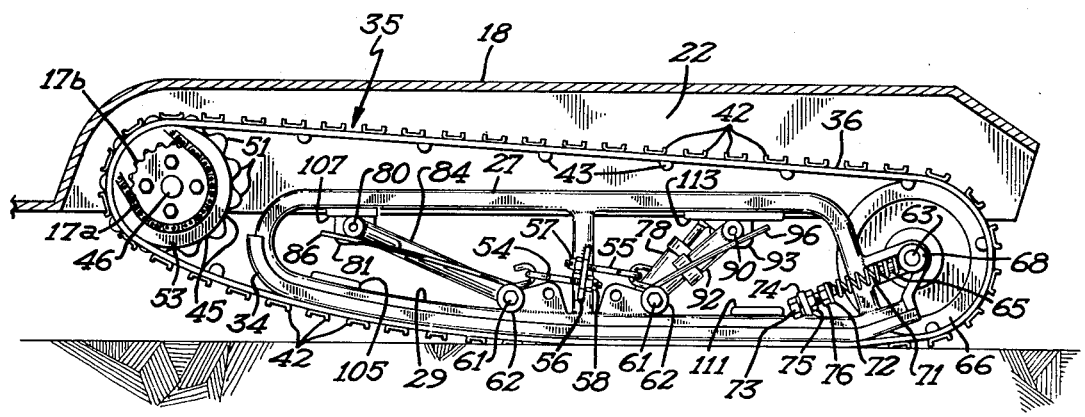
FIG. 3 is a perspective view of the track suspension mechanism showing the upwardly inclined portion of the runner at the forward portion of the slide rail frame.

Turning to FIG. 3, there is shown a side elevational view of the rear tread suspension and slide rail frame, as previously described with regard to the other figures. FIG. 3 shows the forward portion of the slide rail 27 as being inclined upwardly at a point approximately two-thirds of the way forward of the most rear portion of the upstanding frame 26 and 27. The very forward portion is illustrated as being of arcuate configuration joining the upper and lower portions of the frame. It should also be noticed that the slide rail frame extends almost to the point of touching sprocket drive member 45. Thus, endless tread 35 is supported either by a sprocket wheel 45 or by the inclined portion of the runner of frame 27. If an obstacle is encountered, this inclined portion aids in reducing the shock effect without the necessity of having an intervening idler wheel, as shown in the above referred to Swenson et al. U.S. Pat. No. 3,485,312. Elimination of this extra wheel results in both a reduction in cost and a lessening in the weight of the snowmobile. This latter factor is of particular importance when the snowmobile is designed to be used for purposes such as racing.

As has been previously discussed, the preferred form of spring tension adjustment is one where individual adjustment is provided for the forward and rear lever arms. If one adjusts the forward arm so as to provide a maximum loading on the forward portion of slide rail frame 26 and 27, the maximum of tread will ordinarily be in engagement with the ground surface. This will be of particular value where the ground surface is hard-packed snow or ice. The maximum amount of engagement of the tread cross bars 42 with the ground surface for driving purposes is thus attained. On the other hand, if the snowmobile is to be driven over relatively soft snow and high speed is desired, the reverse tensioning of the springs is applied so as to provide the maximum "planing" effect. This reduces the overall drag on the snowmobile vehicle and thus gives greater speed.

I claim:

1. An endless tread and body supporting subassembly for a snowmobile, comprising in combination:
   a. elongated tread supporting means adapted to move within the confines of said endless tread having a pair of upstanding members secured to each other in spaced and confronting relationship, the lower portion of said members forming a pair of runners;
   b. forward and rear body frame supporting double T-shaped lever members pivotally connected to said tread supporting means at the lower portions thereof, said rear lever members having stems constructed to be of variable length, the upper ends of said lever members adapted to be pivotally mounted to the snowmobile body;
   c. a plurality of wheel means secured to the rear portion of said tread supporting means, said wheel means having their axes of rotation in transverse relationship to the longitudinal direction of said elongated tread supporting means;
   d. a transverse bar member joining the lower portions of the upstanding members of said tread supporting means;
   e. a shock absorber having a telescoping spindle portion disposed intermediate the stems of said rear lever members and pivotally mounted at opposite ends thereof to said bar member and to said rear lever member, respectively, said shock absorber being mounted with its spindle axis substantially parallel to said rear lever members, but spatially disposed therefrom; and f. a plurality of spring bias mechanisms mechanically independent from each other, each including tension controlling mechanisms secured thereto controlling the tension in said bias mechanisms and cooperating with said shock absorber, said bias mechanisms engaging said front and rear lever members and urging the upper portion of said lever members away from said runners.

2. An endless tread and body supporting subassembly for a snowmobile, comprising in combination:

a. elongated tread supporting means adapted to move within the confines of said endless tread having a pair of upstanding members secured to each other in spaced and confronting relationship, the lower portions of said members forming a pair of runners, substantially one-third of the forward portions of said runner means being inclined upwardly from the main rear portion thereof and terminating in an arcuate configuration at the forward end thereof, said runners while moving within the confines of said tread provide the sole backing for said endless tread between forward drive sprockets and the ground engaging forward portion of said runners;

b. forward and rear body frame supporting double T-shaped lever members pivotally connected to said tread supporting means at the lower portions thereof, said rear lever members having stems constructed to be of variable length, the upper ends of said lever members adapted to be pivotally mounted on the snowmobile body;

c. a plurality of wheel means secured to the rear portion of said tread supporting means, said wheel means having their axes of rotation in transverse relationship to the longitudinal direction of said elongated tread supporting means;

d. a transverse bar member joining the lower portions of the upstanding members of said tread supporting means;

e. a shock absorber having a telescoping spindle portion disposed intermediate the stems of said rear lever members and pivotally mounted at opposite ends thereof to said bar member and to said rear lever member, respectively, said shock absorber being mounted with its spindle axis substantially parallel to said rear lever members, but spatially disposed therefrom; and f. a plurality of spring bias mechanisms operable independently from each other including tension controlling mechanisms secured thereto controlling the tension in said mechanisms, said mechanisms engaging said front and rear lever members and urging the upper portion of said lever member away from said runners.

* * * * *